```
INTRODUCE POWDERED FERRITE
    INTO CARRIER GAS
```

↓

```
PASS CARRIER GAS
AND POWDERED FERRITE
THROUGH ARC-PLASMA TORCH
       SO AS TO
     HEAT FERRITE
```

↓

```
DEPOSIT HEATED FERRITE
    ON A SUBSTRATE
```

Fig - 1

995 GAUSS/DIV. VERTICAL
1.1 Oe/DIV. HORIZONTAL

INVENTORS.
DOUGLAS H. HARRIS
RICHARD J. JANOWIECKI
BY

ATTORNEY.

United States Patent Office 3,576,672
Patented Apr. 27, 1971

3,576,672
METHOD OF PLASMA SPRAYING FERRITE COATINGS AND COATINGS THUS APPLIED
Douglas H. Harris and Richard J. Janowiecki, Dayton, Ohio, asignors to Monsanto Research Corporation, St. Louis, Mo.
Continuation-in-part of application Ser. No. 529,281, Feb. 23, 1966. This application June 12, 1969, Ser. No. 833,896
Int. Cl. B05b 7/22
U.S. Cl. 117—235
52 Claims

ABSTRACT OF THE DISCLOSURE

Process for depositing ferrite coatings of preferred orientation and controlled quality by using a direct current arc plasma generator to heat powdered ferrites under prescribed conditions, said coatings having useful magnetic properties.

---

This is a continuation-in-part of application Ser. No. 529,281, filed Feb. 23, 1966, and now abandoned.

BACKGROUND OF THE INVENTION

This invention pertains to a process for depositing a ferromagnetic coating by projection of heated particulate material onto a base using an arc plasma torch, and particularly provides a method of depositing ferrite coatings of controlled quality and useful magnetic properties.

Ferrites, which are ferromagnetic compounds containing $Fe_2O_3$, have shown interesting magnetic properties and have found many applications in new technological developments such as computers, television receiving sets, communication systems, and many others. The term ferrite is used here in the language of commerce to refer to compounds containing $Fe_2O_3$, as for example, barium ferrite, $BaFe_{12}O_{19}$; nickel zinc ferrite, e.g., $$Ni_{0.4}Zn_{0.6}Fe_2O_4$$

etc. Alternatively, in the chemical literature, e.g., Chemical Abstracts, these compounds may be referred to as "ferrates (III)." It should be noted that the term "ferrite" as used here does not refer to the allotropic forms of metallic iron, sometimes designed $\alpha$-ferrite and $\beta$-ferrite.

Ferrites are commonly prepared by mixing together the constituent metal oxides, carbonates or oxalates and prefiring them at about 1000° C. They are then ground and mixed again, and either applied as a coating or pressed into a shaped object and sintered at 1100–1450° C. The final fired objects is polycrystalline and usually is somewhat porous. Depending upon their composition they may have any of several crystal structures: spinel, magnetoplumbite, distorted perovskite, or garnet. Their composition may vary considerably from one ferrite to another, so long as there is one or more metal oxides in combination with $Fe_2O_3$, as for instance BaO in barium ferrite; or MnO, ZnO and MgO in a manganese-zinc-magnesium ferrite. A portion of the $Fe_2O_3$ may be replaced by the oxide of a metal in the oxidation state of 3, e.g., $Al_2O_3$ in a ferrite having the formula $$Ni_{0.85}Cu_{0.1}Co_{0.03}Mn_{0.02}Al_{0.4}Fe_{1.6}O_4$$

Coatings of ferrites have been made in the past by ceramic techniques, often with considerable difficulty in view of the problems encountered. Thus, slips or slurries of ferrites in water have been applied to the surface of plates or drums, then dried and subsequently baked to harden. Often the coatings have been non-uniform and discontinuous due to shrinkage and cracking. The high temperatures required for sintering (usually over 1000° C.) have caused warping of the coated substrate as it has cooled, due to the differences in the coefficient of expansion of the ferrite and the metallic substrate. To lower the calcining temperatures, recourse has been made to fluxes and additives, necessitating a comprise as to magnetic properties which are notoriously sensitive to changes in composition and the presence of impurities.

The prolonged heating at high temperatures employed in the past to effect sintering the ferrite coatings has required careful control of the atmosphere around the heated objects in order to maintain the proper stoichiometry of metal to oxygen in the finished ferrite. Particular difficulty is encountered with layers of massive bodies of ferrites which are thicker than $\frac{1}{16}$ in., since the equilibrium between the metal oxide and the atmosphere is more slowly attained as the thickness increases. For moderately thick objects it may be necessary to expose the heated objects to the atmosphere for many hours so as to achieve the proper stoichiometry of metal to oxygen in the finished ferrite. The porosity and density of the final object may vary depending upon the previous treatment and may affect the magnetic properties and subsequent performance of the device.

Previously, ferrites have been sprayed or sputtered from a gaseous or vapor phase as disclosed in U.S. Pat. No. 3,100,295, issued Aug. 6, 1963, to Schweizerhof. Spraying ferrites with a flame spray gun is generally unsatisfactory, however, due to limited conditions of temperature and enveloping atmospheres, as well as inadequate process control, resulting in low quality crystalline and magnetic properties. Thus, the flame-sprayed coating may have poor stoichiometry, non-uniformity, low density, etc. Furthermore they may be contaminated by undesirable phases or by the by-products of the combustion of the flame, viz oxides of carbon and/or water vapor. Sputtering generally requires bulky evacuated chambers and heated sources, and is a slow and tedious method of deposition, often resulting in unsatisfactory stoichiometry control in many oxide compounds.

SUMMARY OF THE INVENTION

An object of this invention is to provide an improved means of forming an adherent coating of a ferrite on a substrate, the ferrite having useful ferromagnetic properties. Another object is to provide a means of making a ferrite body by deposition of a sprayed ferrite.

Another object is to provide a process for depositing ferrite coatings of controlled quality by using an arc plasma torch to heat powdered ferrites under prescribed conditions, said coatings having useful magnetic properties.

Still a further object is to provide ferrite coatings having improved crystalline and magnetic properties, including preferred orientation of the easy axis of magnetization and high remanence ratio.

These and other objects hereinafter defined are met by the invention wherein there is provided a method of depositing a ferrite on a substrate which comprises introducing a finely-powdered ferrite into a powder-carrier gas, passing said gas and said ferrite through a direct current (D.C.) arc plasma gas stream so as to heat said ferrite, and causing said heated ferrite to impinge against and adhere to said substrate.

One embodiment of a D.C. plasma gas stream may be an arc-plasma torch such as any one of several commercially available. It may also be a torch especially designed to provide some specific processing advantage, e.g., more satisfactory powder feeding, use of special arc gases to realize temperature or environmental advantages, etc. providing the torch employs an electric D.C. arc to produce a hot stream of dissociated and/or ionized gas. A typical plasma spray gun and accessory equipment is shown in "Plasma Jet Technology," NASA SP-5033, October, 1965, page 44. An improved version is shown in Bulletin No. 178 published by Metco, Inc., Westbury, N.Y. Another useful torch is that described in U.S. Pat. No. 3,183,337, issued May 11, 1965 to Winzeler et al. Still another torch is that described in U.S. Pat. No. 3,148,263, issued Sept. 8, 1964 to Jensen. The electric power supply may be controlled both as to voltage and current, higher temperatures in the plasma effluent usually resulting from higher wattage inputs to the electrodes. The plasma arc gas may be nitrogen, helium or argon, and mixtures thereof, nitrogen or argon mixed with hydrogen, or even air. The desired stoichiometry of metal-to-oxygen in the ferrite can be maintained by control of air or oxygen in the plasma or powder-carrier or shroud or external gas, in addition to control of plasma gas temperature and composition, residence time, and powder particle size. The torch input power, arc gas flow rate and heat losses due to electrode cooling control the plasma stream enthalpy and hence the temperature at the torch nozzle exit. Plasma stream temperature, residence time and mode of powder injection affect melting of feed powder particles of a particular size. The powder-carrier gas generally employed in the past has been argon, but we have also used oxygen or oxygen-containing gas mixtures, for the reasons to be set forth below. The powder is conveniently fed into the arc by a powder-carrier gas at a point near the nozzle exit. Finely divided powders, e.g., minus 325 mesh, normally give better coatings because they can be heated quickly and uniformly to a softened state before being blown against the workpiece. Although the material ultimately forming the deposited coating may be in a partially fluid state, it is probably not in a gaseous or vapor state.

For some ferrites we prefer to use an arc-plasma torch provided with a means of conducting a shroud gas to and around the heated ferrite, e.g., the torch described in U.S. Pat. No. 3,313,908, issued Apr. 11, 1967 to Unger et al. We have found that the carrier gas and shroud gas is preferably oxygen for the production of satisfactory ferrite deposits. Thus, plasma-deposited magnesium manganese aluminum-substituted ferrites and nickel zinc ferrites laid down under an oxygen shroud gas have markedly higher (superior) resistivity compared with deposits prepared under argon shroud gas.

Accordingly, our preferred process comprises forming an arc-plasma stream from a flowing arc gas by means of a direct current arc, introducing a finely-powdered ferrite into a flowing powder-carrier gas, passing said powder-carrier gas and said ferrite into said arc-plasma stream so as to heat said ferrite, providing a shroud gas surrounding said heated ferrite, providing a preheated substrate at a distance from the torch nozzle of between 0.25 and 2.5 inches, and causing said heated ferrite to impinge against and adhere to said substrate.

The plasma deposition process is admirably suited to a variety of substrates including even plastic or paper substrates which are heat-sensitive. We have found, however, that the initial temperature of the substrate may have an effect upon the quality of the deposited ferrite, and that it may be desirable to use substrates which can be preheated, e.g., alumina, titanates, graphite, sodium chloride, etc. The process is adaptable to metal or ceramic surfaces. Furthermore the substrates are not limited to flat geometries but may have contoured or irregular surfaces. By using masks, limited areas may be deposited, useful for miniature or subminiature circuitry.

Although many types of materials have been deposited using arc-plasma spray guns, we have found that the deposition of ferrites having specific useful magnetic and crystalline properties is extremely difficult. Quality control of the deposited ferrites is dependent on a specific and unique choice of such variables as arc gas type and flow, arc current, powder carrier gas type and flow, shroud gas type and flow, substrate preheat temperature and substrate distance from the torch nozzle.

By maintaining quality control through use of a unique formula for each specific ferrite, we have been able to prepare deposits having superior magnetic and crystalline properties. Thus, the crystalline unit cell dimensions may be held within a variation of a few angstroms, resulting in a very uniform product having no separation or segregation of components. The density of the deposited ferrite can be made within acceptable tolerance of the theoretical density of the bulk ferrite.

We have discovered that ferrite deposits having preferentially oriented crystalline layers may be obtained by this process, useful for microwave devices. The manner in which this occurs has not been established with certainty, but we believe it is related to the fact that the arc plasma consists of a stream of ionized particles. This induces a magnetic field. Upon exposure to this field, the substrate-adherent molten particles which are paramagnetic (above the Curie temperature) form oriented crystallites as they cool below melt temperature. The deposit, then, exhibits preferred crystalline orientation which is manifested in its X-ray diffraction pattern and in the enhanced rectangularity of the hysteresis loop ($4\pi M$ versus $H$).

Ferrite deposits having superior magnetic properties are obtained because of orientation, e.g., a high $4\pi M_r/4\pi M_s$ ratio of over 0.80, where $4\pi M_r$ is the magnetic moment remanence and $4\pi M_s$ is the magnetic moment saturation. Such deposits are useful in latching phase shifters and microwave circulators where the increased $4\pi M_r$ enhances their performance.

The composition of certain ferrite deposits is controllable as to $\alpha$-$Fe_2O_3$ content, by use of suitable parameters disclosed herein, thereby enabling control of the magnetic properties which are related to $\alpha$-$Fe_2O_3$ content.

Furthermore, we have discovered that the present process is a means of providing ferrite coatings of ultrafine crystallite size, i.e., less than 1 micron and even as small as 0.02 micron. These crystallites are highly uniform. It is well known in the application of ferrites that magnetic coercivity is governed by grain size; likewise in microwave ferrites the spinwave line width ($\Delta H_k$) which determines the power handling capabilities of the device. The present process is suited to the production of latching devices from conventionally linear material such as nickel zinc ferrites by tailoring the crystallite size (by annealing) to yield the desired coercivity and remanence magnetization values through control of the width of the hysteresis loop. Likewise the coatings for microwave and memory devices depending upon magnetic coupling may be optimized by controlled development of the ultrafine crystallites produced by this process. By contrast, conventional ceramic methods of firing and annealing ordinarily yield grain sizes of over 10 microns, which, once developed, cannot be reduced in size to, e.g., the 1–10 micron range. Furthermore, by our arc-plasma deposition, individual components of a device may be deposited separately having different crystallite sizes, as in preparing regions of different coercivity.

Although the present process is directed principally toward coatings of less than 0.100 in. thickness, ferrites may be built-up into massive bodies by prolonged application of the arc-plasma spray process. During this process, means may be provided for cooling the body, as by resting it upon a base through which cooling fluid (e.g., water) is circulated, or by directing a cooling gas against the body. The body may be built-up around an electrical component, such as a coil, or around metal inserts, such as machine screws, fasteners, handles, etc.

Free-standing films may be formed by coating a destructible or separable substrate, such as graphite, which may later be removed mechanically or on a cellulosic material which may be burned away, or on a metal base such as Inconel to which the deposited ferrite does not adhere well, or on a metal base such as copper which may be removed by dissolving in acid, or even on a watersoluble base such as sodium chloride which may be removed by washing away with water. Normally the arc-plasma sprayed ferrites are dense, well-bonded monolithic structures having superior electromagnetic and physical properties by comparison with those of ceramic- or plastic-bonded ferrites.

The presently described ferrite coatings, prepared from properly selected ferrite feed stock of suitable composition, are useful in (I) microwave applications, including microstrip circulators, microstrip phase shifters, microstrip hybrids, microstrip isolators, microstrip filters, stripline ciculators, stripline phase shiftes, stripline isolators, limiters and wave guide devices, including toroids, needles, and flat plates; (II) digital memory applications, including main frame memory (Destructive Read Out), main frame memory (Non-Destructive Read Out), associative memory and read-only memory; (III) magnetic logic, including domain tip propagation logic and coercivity control logic; (IV) discrete devices, including time delays, inductors transformers, microminature permanent magnets and magnetic switches; and (V) integrated circuit devices, including inductors, transformers, filters, and time delay devices.

Examples of devices in which deposited ferrite films are useful include: a microwave limiter in U.S. Pat. No. 3,356,967 issued to Honig; a stripline circulator in U.S. Pat. No. 3,335,679 issued to Carr; and a switchable circulator in U.S. Pat. No. 3,355,680 issued to Saltzman et al.

The mathematical formulas shown herein were developed from a study of process variables including arc gas flow, arc current, carrier gas flow, shroud gas flow, substrate preheat temperature and substrate distance as related to properties of coatings, e.g., lattice constant ($a_0$). Regression analyses were employed, using a computer, to obtain the best linear relationships between the process variables and the product properties with the smallest standard deviation of residuals.

A preferred form of our process is an automated system for quality control of arc plasma-deposited ferrites comprising means of measuring and controlling the process variables of arc gas flow, arc current, carrier gas flow, shroud gas flow, substrate preheat temperature and substrate distance over the range of conditions disclosed.

BRIEF DESCRIPTION OF THE DRAWINGS

Some of the novel features of the present invention will become apparent from the following description which is to be considered in connection with the accompanying drawings. In FIG. 1 there is portrayed a systematic flow-sheet of a specific embodiment showing the steps in the process, viz introducing powdered ferrite into a carrier gas, passing carrier gas and powdered ferrite though an arc-plasma torch so as to heat ferrite, and depositing ferrite on a substrate.

DESCRIPTION OF THE PREFERRED EMBODIMENTS

Figure 2:
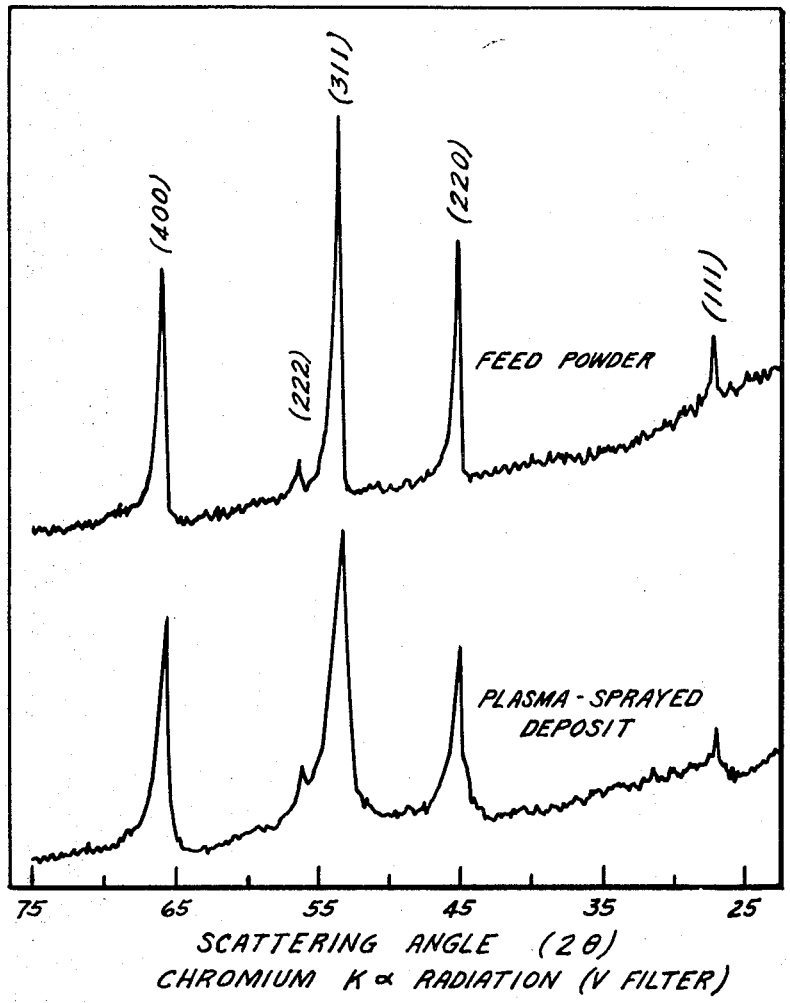
In FIG. 2 there is shown a portion of the X-ray diffraction powder pattern for (at the top of the figure) a randomly oriented magnesium manganese ferrite feed stock as compared with that of the preferentially oriented ferrite deposit (at the bottom of the figure). The peak heights, corresponding to reflection intensity, are noted for the (220) and (400) reflections: The respective peak heights are approximately equal for the two reflections in the randomly oriented sample whereas they are of different heights in the preferentially oriented sample. The (400) reflection is stronger, showing preferred orientation for the ($h$00) plane of atoms.

The invention is further illustrated by, but not limited to, the following examples.

Example 1

A magnesium manganese ferrite containing approximately 10% Mg and 20% Mn, the balance being substantially iron and oxygen, was ground to pass through a 325 mesh sieve. The powdered ferrite was charged to a pressurized feed hopper. Using argon as plasma-forming gas at 114 c.f.h., helium as carrier gas, the powder was blown into the plasma gas stream of an 80 kw. arc-plasma torch, Plasmadyne Model SG–2, described in Bulletin C–112–6–62, Plasmadyne Corporation. This plasma torch contained no shroud gas provisions. The arc-plasma was maintained at a current of 970 amps. and a voltage of 34.5 v., corresponding to 33.2 kw. The torch was directed toward a copper substrate held at a distance of 3 inches from the nozzle of the torch. The ejected ferrite adhered to the copper and formed a smooth dense coating having excellent appearance. When analyzed on a magnetic hysteresis curve tracer, there was obtained a curve typical of the original bulk material, showing that it was a useful magnetic material.

Example 2

To show the effect of varying conditions on the unit cell dimension ($a_0$) of plasma-deposited magnesium manganese ferrite.

A magnesium manganese ferrite was used, containing approximately 15.4% magnesium, 3.8% manganese and 47.6% iron with the remainder essentially oxygen. It was ground to pass a 400 mesh sieve. X-ray diffraction analysis of this ferrite feed stock revealed that 92–95% of the crystalline content by weight was attributable to a spinel phase having $a_0$=8.397 and 5–8% to a wustite phase having $a_0$=4.212.

A commercially-available high velocity plasma arc torch was used, Plasmadyne Model SG–1B, as described in Bulletin 1001 of Giannini Scientific Corporation, Santa Ana, Calif. The ground ferrite was introduced into the arc-plasma torch with a carrier gas. The specific conditions used for deposition are shown in the following table, together with the properties of the as-deposited coatings. For all of the coatings, the substrate consisted of 20-mil alumina identified in the trade as Diamonite P–3864.

Especial significance is attached to the lattice constant ($a_0$) of the cubic ferrite system as an indication of and as a necessary condition for stoichiometric structure. Thus, the spinel phase of this ferrite feed stock composition has $a_0$=8.397; the as-deposited coating in 2–C has $a_0$=8.396, showing substantially the same structure.

| | A | B | C | D | E | F | G | H |
|---|---|---|---|---|---|---|---|---|
| Conditions: | | | | | | | | |
| Arc gas flow argon, c.f.h | 91.7 | 122 | 122 | 91.7 | 122 | 140 | 78 | 140 |
| Arc current, amperes | 510 | 410 | 410 | 410 | 410 | 600 | 300 | 300 |
| Powder carrier gas flow oxygen, c.f.h | 22 | 28 | 22 | 22 | 16 | 33 | 33 | 33 |
| Shroud gas flow oxygen, c.f.h | 56 | 56 | 56 | 33 | 56 | 22 | 22 | 66 |
| Substrate preheat temp., ° C | 1,035 | 735 | 1,035 | 735 | 1,050 | 1,200 | 1,200 | 600 |
| Distance to substrate, inches | 0.75 | 0.75 | 1.25 | 0.75 | 0.75 | 0.75 | 1.25 | 0.75 |
| Properties of coating: | | | | | | | | |
| Lattice constant, $a_0$(A.) | 8.402 | 8.408 | 8.396 | 8.401 | | 8.406 | 8.401 | 8.412 |
| Coercivity ($H_0$), oersteds | | | | | [1] 1.77 | | | |

[1] After annealing at 1,200° C. for 6 hours.

From the above data, as well as from other experimental data, a linear relationship was derived between the lattice constant ($a_0$) of the sprayed coating and the process conditions as represented by the following equation:

$$\alpha_0 = 8.4090 + 0.366 \times 10^{-4} X_2$$
$$a_0 = 8.4090 + 0.366 \times 10^{-4} X_2 - 0.2166 \times 10^{-4} X_5$$

wherein:

$X_2$ = arc current in amperes over the range 300–600 amp;
$X_4$ = shroud gas flow in cubic feet per hour over the range 22–66 c.f.h.;
$X_5$ = substrate preheat temperature in degrees centigrade over the range 600–1200° C.;
the arc gas flow is maintained within the range 78–140 c.f.h.;
the carrier gas flow is maintained within the range 16–33 c.f.h.; and
the substrate distance is maintained within the range 0.75–1.25 in.

Example 3

To show the effect of varying conditions on the properties of plasma-deposited magnesium manganese aluminum-substituted ferrite, a microwave ferrite.

A magnesium manganese aluminum-substituted ferrite was used, containing approximately 12.9% magnesium, 2.7% manganese, 3.0% aluminum and 47.5% iron with the remainder essentially oxygen. It was ground to pass a 400 mesh sieve. X-ray diffraction analysis of this ferrite feed stock revealed that 98% of the crystalline content by weight was attributable to the spinel phase having $a_0 = 8.368$ A. and 2% to a wustite species having $a_0 = 4.215$ A.

A plasma arc torch was used as described in Example 2.

The specific conditions used for deposition are shown in the following table, together with the properties of the as-deposited coatings. For all of the coatings, the substrate consisted of 20-mil alumina (Diamonite P–3864).

|  | A | B | C | D | E | F |
|---|---|---|---|---|---|---|
| Conditions: |  |  |  |  |  |  |
| Arc gas flow argon, c.f.h | 140 | 78 | 78 | 78 | 140 | 140 |
| Arc current, amperes | 300 | 600 | 300 | 300 | 300 | 600 |
| Carrier gas flow oxygen, c.f.h | 11 | 11 | 11 | 22 | 22 | 22 |
| Shroud gas flow oxygen, c.f.h | 22 | 22 | 22 | 22 | 66 | 66 |
| Distance to substrate, inches | 0.75 | 0.75 | 0.75 | 0.75 | 1.25 | 0.75 |
| Substrate preheat temp., ° C | 600 | 600 | 1,200 | 600 | 1,200 | 1,200 |
| Properties of coating: |  |  |  |  |  |  |
| Lattice constant, $a_0$ (A.) | 8.374 | 8.372 | 8.366 | 8.378 | 8.366 | 8.368 |
| Crystallite size ($\mu$) | 0.023 | 0.015 | 0.048 | 0.025 | 0.050 | 0.130 |
| Density (g./cc.) | 4.11 |  |  | ¹4.24 |  |  |

¹ Theoretical density 4.20.

From the above data, as well as from other experimental data, a linear relationship was derived between the lattice constant ($a_0$) of the sprayed coating and the process conditions as represented by the following equation:

$$a_0 = 8.3826 - 0.1168 \times 10^{-4} X_5$$

wherein:

$X_5$ = substrate preheat temperature in degrees centigrade over the range 600–1200° C.;
the arc gas flow is maintained within the range 78–140 c.f.h.;
the arc current is maintained within the range 300–600 amp.;
the carrier gas flow is maintained within the range 11–22 c.f.h.;
the shroud gas flow is maintained within the range 22–66 c.f.h.; and
the substrate distance from the torch nozzle is maintained within the range 0.75–1.25 inches.

From Examples 2 and 3 it can be seen that a specific embodiment of our invention lies in the method of depositing a ferrite on a substrate wherein the ferrite is selected from the group consisting of a magnesium manganese ferrite and a magnesium manganese aluminum-substituted ferrite by a method which comprises (a) forming an arc-plasma stream from a flowing arc gas of argon within the range of 78–140 c.f.h. by means of a direct current arc within the range 300–600 amperes, (b) introducing a finely-powdered ferrite into a flowing powder-carrier gas comprising oxygen within the range 10–35 c.f.h., (c) passing said powder-carrier gas and said ferrite into said arc-plasma stream so as to heat said ferrite, (d) providing a shroud gas surrounding said heated ferrite, said shroud gas comprising oxygen within the range 22–70 c.f.h., (e) providing a heated substrate at a distance from the torch nozzle of between 0.25 and 2.5 inches, said preheated temperature being within the range 600–1200° C., and (f) causing said heated ferrite to impinge against and adhere to said substrate.

Typical coatings having acceptable values for $a_0$ were examined for coercivity ($H_c$). Unannealed samples showed about 35 oersteds. Samples annealed at 1100–1300° C. for 3–20 hours displayed values generally below 10 oersteds: e.g., a sample annealed at 1200° C. for 6 hours showed 1.16 oersteds.

Example 4

To show the effect of varying conditions on the unit cell dimension ($a_0$) of plasma-deposited nickel zinc ferrite, a linear ferrite.

A nickel zinc ferrite was used, containing approximately 15.2% nickel, 11.3% zinc, 0.5% manganese and 45.9% iron with the remainder essentially oxygen. It was ground to pass a 400 mesh sieve. X-ray diffraction analysis of this ferrite feed stock gave a lattice constant ($a_0$) of 8.385.

A plasma arc torch was used as described in Example 2.

The specific conditions used for deposition are shown in the following table, together with the properties of the as-deposited coating. For all of the coatings, the substrate consisted of 20-mil alumina (Diamonite P–3864).

|  | A | B | C | D | E |
|---|---|---|---|---|---|
| Conditions: |  |  |  |  |  |
| Arc gas flow argon, c.f.h | 138 | 138 | 138 | 138 | 55 |
| Arc current, amperes | 600 | 300 | 600 | 600 | 600 |
| Carrier gas flow oxygen, c.f.h | 32 | 28 | 28 | 28 | 42 |
| Shroud gas flow oxygen, c.f.h | 49 | 49 | 49 | 49 | 49 |
| Distance to substrate, inches | 0.75 | 0.75 | 0.75 | 1.25 | 0.75 |
| Substrate preheat temp., ° C | 800 | 25 | 25 | 25 | 25 |
| Properties of coating: Lattice constant, $a_0$ (A.) | 8.369 | 8.393 | 8.386 | 8.407 | t.375 |

From the above data, as well as from other experimental data, a linear relationship was derived between the lattice constant ($a_0$) of the sprayed coating and the process conditions as represented by the following equation:

$$a_0 = 8.3625 - 0.4713 \times 10^{-4} X_2$$
$$- 0.1270 \times 10^{-4} X_5$$
$$+ 0.5846 \times 10^{-1} X_6$$

wherein:

$X_2$ = arc current in amperes over the range 300–600 amp.,
$X_5$ = substrate preheat temperature in degrees centigrade over the range 25–800° C.,
$X_6$ = substrate distance from the torch nozzle in inches over the range 0.75–1.25 in., the arc gas flow is maintained within the range 55–138 c.f.h.,
the carrier gas flow is maintained within the range 12–42 c.f.h., and
the shroud gas flow is maintained within the range 12–49 c.f.h.

Example 5

To show the effect of varying conditions on the properties of plasma-deposited magnesium manganese zinc ferrite, a switching ferrite.

A magnesium manganese zinc ferrite was used containing approximately 19.3% manganese, 0.9% magnesium, 5.7% zinc and 45.8% iron with the remainder essentially oxygen. It was ground to pass a 400 mesh sieve. X-ray diffraction analysis of this ferrite feed stock revealed no $\alpha$-$Fe_2O_3$ and a lattice constant ($a_0$) of 8.496.

A plasma arc torch was used as described in Example 2.

The specific conditions used for deposition are shown in the following table, together with the properties of the as-deposited coatings. For all of the coatings, the substrate consisted of 20-mil alumina (Diamonite P-3864).

|   | A | B | C | D | E |
|---|---|---|---|---|---|
| Conditions: | | | | | |
| Arc gas flow argon, c.f.h. | 140 | 61 | 61 | 140 | 61 |
| Arc current, amperes | 400 | 400 | 400 | 550 | 400 |
| Carrier gas flow oxygen, c.f.h. | 20 | 13 | 13 | 20 | 20 |
| Shroud gas flow oxygen, c.f.h. | 50 | 17 | 17 | 50 | 17 |
| Distance to substrate, in. | 1.125 | 1.125 | 0.75 | 1.125 | 0.75 |
| Substrate preheat temp., °C | 1,200 | 25 | 25 | 25 | 25 |
| Properties of coating: | | | | | |
| Percent $Fe_2O_3$ | 40 | 0 | 0 | 23 | 0 |
| Lattice constant, $a_0$ (Å) | 8.479 | | | 8.482 | |
| Crystallite size ($\mu$) | 0.037 | 0.036 | | 0.37 | |
| Strain | 0.12 | 0.21 | | 0.11 | |

From the above data, as well as from other experimental data, a linear relationship was derived between the percent $Fe_2O_3$ of the sprayed coating and the process conditions as represented by the following equation:

$$\text{Percent } \alpha\text{-}Fe_2O_3 = -13.6789 + 0.1044 X_2 + 0.1588 \times 10^{-1} X_5 - 0.2092 \times 10^2 X_6$$

wherein:

$X_2$ = arc current in amperes over the range 400–550 amp.;
$X_5$ = substrate preheat temperature in degrees centigrade over the range 25 to 1200° C.; and
$X_6$ = substrate distance from torch nozzle in inches over the range 0.75–1.125 in.;
the arc gas flow is maintained within the range 61–140 c.f.h.;
the carrier gas flow is maintained within the range 13–20 c.f.h.; and
the shroud gas flow is maintained within the range 17–50 c.f.h.

Example 6

To show the effect of varying conditions on the properties of plasma-deposited nickel zinc ferrite.

A nickel zinc ferrite was used, containing approximately 6.9% nickel, 11.7% zinc, 1.0% manganese, and 52.0% iron with the remainder essentially oxygen. It was ground to pass a 400 mesh sieve. X-ray diffraction analysis of this ferrite feed stock revealed that 98% of the crystalline content by weight was attributable to a spinel phase having $a_0$=8.389. No $\alpha$-$Fe_2O_3$ was present.

A plasma arc torch was used as described in Example 2.

The specific conditions used for deposition are shown in the following table, together with the properties of the as-deposited coatings. For all of the coatings, the substrate consisted of 20-mil alumina (Diamonite P-3864).

|   | A | B | C | D |
|---|---|---|---|---|
| Conditions: | | | | |
| Arc gas flow argon, c.f.h. | 106 | 55 | 55 | 55 |
| Arc current, amperes | 650 | 350 | 350 | 350 |
| Carrier gas flow oxygen, c.f.h. | 17 | 8 | 8 | 17 |
| Shroud gas flow oxygen, c.f.h. | 45 | 11 | 45 | 11 |
| Distance to substrate, inches | 1.125 | 0.75 | 0.75 | 0.75 |
| Substrate preheat temp., °C | 1,200 | 1,200 | 25 | 25 |
| Properties of coating: | | | | |
| Percent $F_2O_3$ | 53 | 39 | 0 | 0 |
| Lattice constant, $a_0$ (Å) | | | 8.379 | 8.389 |
| Crystallite size ($\mu$) | | | 0.03 | 0.026 |

From the above data, as well as from other experimental data, a linear relationshhip was derived between the percent $Fe_2O_3$ of the sprayed coating and the process conditions as represented by the following equation:

$$\text{Percent } \alpha\text{-}Fe_2O_3 = -18.6480 + 0.4053 \times 10^{-1} X_2 + 0.6902 X_3 + 0.2699 \times 10^{-1} X_5$$

wherein:

$X_2$ = arc current in amperes over the range 350–650 amp.;
$X_3$ = carrier gas flow in cubic feet per hour over the range 8–17 c.f.h.; and
$X_5$ = substrate preheat temperature in degrees centigrade over the range 25–1200° C.;
the arc gas flow is maintained within the range 55–106 c.f.h.;
the shroud gas flow is maintained within the range 11–45 c.f.h.; and
the substrate distance from the torch nozzle is maintained within the range 0.75–1.125 in.

Samples of as-deposited coatings 6–C and 6–D were examined by X-ray diffraction for evidence of preferred orientation. The intensity of the (400) reflection referenced to the norm of other strong lines was found to be 1.60–1.75 times as strong as found for randomly oriented powder of the same composition. This indicated preferred orientation of the ($h$00) planes of the deposited ferrite.

Example 7

To show the effect of varying conditions on the properties of plasma-deposited yttrium iron garnet.

An yttrium iron garnet was used, containing approximately 36.0% yttrium and 37.4% iron, with the remainder essentially oxygen. It was ground to pass a 400 mesh sieve. X-ray diffraction analysis of this ferrite feed stock gave a lattice constant ($a_0$) of 12.377.

A plasma arc torch was used as described in Example 2.

The specific conditions used for deposition are shown in the following table together with the properties of the as-deposited coatings. For all of the coatings, the substrate consisted of 20-mil forsterite (identified as Trans-Tech DS-6).

|   | A | B | C | D | E |
|---|---|---|---|---|---|
| Conditions: | | | | | |
| Arc gas flow argon, c.f.h. | 106 | 106 | 106 | 106 | 238 |
| Arc current, amperes | 400 | 600 | 600 | 400 | 600 |
| Carrier gas flow oxygen, c.f.h. | 11 | 28 | 11 | 11 | 11 |
| Shroud gas flow oxygen, c.f.h. | 39 | 60 | 39 | 39 | 60 |
| Distance to substrate, inches | 0.625 | 0.625 | 0.625 | 1.125 | 1.125 |
| Substrate preheat temp., °C | 1,000 | 1,000 | 600 | 600 | 1,000 |
| Properties of coating: | | | | | |
| Lattice constant, $a_0$ (Å) | 12.401 | 12.407 | 12.392 | 12.41 | 12.403 |
| Crystallite size ($\mu$) | 0.12 | 0.046 | 0.07 | 0.14 | 0.14 |

From the above data, as well as from other experimental data, a linear relationship was derived between the crystallite size (C.S.) of the sprayed coating and the process conditions as represented by the following equation:

$$\text{C.S.} = -0.04148 - 0.1008 \times 10^{-2} X_1 - 0.9059 \times 10^{-2} X_3 + 0.3857 \times 10^{-2} X_4 + 0.1275 \times 10^{-3} X_5 + 0.1440 X_6$$

wherein:

$X_1$ = arc gas flow in cubic feet per hour over the range 106–238 c.f.h.;
$X_3$ = carrier gas flow in cubic feet per hour over the range 11–28 c.f.h.;

$X_4$=shroud gas flow in cubic feet per hour over the range 39–60 c.f.h.;
$X_5$=substrate preheat temperature in degrees centigrade over the range 600–1000° C.;
$X_6$=substrate distance from the torch nozzle in inches over the range 0.625–1.125 in.; and
the arc current is maintained within the range 400–600 amp.

Example 8

To illustrate the arc-plasma deposition of oriented ferrite films having the easy axis of magnetization [111] aligned within the plane of the deposited film as applied to non-oriented substrate.

A series of ferrites comprising representative examples of magnesium manganese ferrite, magnesium manganese aluminum-substituted ferrite, nickel zinc ferrite, magnesium manganese zinc ferrite and yttrium iron garnet materials were ground to pass a 325 mesh sieve. X-ray diffraction and wet analyses revealed the following approximate chemical content and crystal structure of the ferrite feed stocks:

|  | A | B | C | D | E |
|---|---|---|---|---|---|
| Chemical content, percent: |  |  |  |  |  |
| Mg | 15.4 | 12.9 |  | 0.9 |  |
| Ni |  |  | 15 |  |  |
| Mn | 3.8 | 2.7 | 0.5 | 19.3 |  |
| Y |  |  |  |  | 36.0 |
| Zn |  |  | 11.3 | 5.7 |  |
| Fe | 47.6 | 47.5 | 45.9 | 45.8 | 37.4 |
| Al |  | 3 |  |  |  |
|  |  | Balance O₂ |  |  |  |
| Crystallinity, percent: |  |  |  |  |  |
| Spinel | 92–95 | 98 | 100 | 100 |  |
| Garnet |  |  |  |  | 100 |
| Wustite |  | 5–8 | 2 |  |  |
| Lattice constant ($a_0$) | ¹8.397 | ¹8.368 | 8.386 | 8.496 | 12.377 |

¹ Spinel.

The arc-plasma torch was used as described in Example 2. Conditions for processing were selected on the basis of procedures described in preceding Examples 2–7. Specific conditions are shown in the following table and are representative of a series of samples fabricated over ranges listed in Examples 2–7.

|  | A | B | C | D | E |
|---|---|---|---|---|---|
| Conditions: |  |  |  |  |  |
| Arc gas flow argon, c.f.h. | 122 | 106 | 138 | 61 | 106 |
| Arc current, amperes | 410 | 500 | 600 | 400 | 600 |
| Carrier gas flow oxygen, c.f.h. | 16 | 33 | 28 | 20 | 11 |
| Shroud gas flow oxygen, c.f.h. | 55 | 38.5 | 50 | 17 | 35 |
| Substrate | (¹) | (¹) | (²) | (²) | (³) |
| Distance to substrate, inches | 0.75 | 1.50 | 0.75 | 0.75 | 0.625 |
| Substrate preheat temp., °C | 1,050 | 1,000 | 25 | 25 | 600 |

¹ Magnesium titanate; Trans Tech D-13.
² Alumina; Diamonite P-3864.
³ Fosterite; Trans Tech DS-6.

The resulting films were examined by X-ray diffraction techniques for crystal structure and evidence of crystallite orientation. In was found that these films exhibited an enhanced reflection corresponding to the (400) plane reflection which is interpreted as having the ($h$00) planes oriented at small angles or parallel to the surface of the deposited film. The easy axis of magnetization is the body diagonal direction [111] and forms an angle of 35.25° with the ($h$00) planes so as to be parallel or nearly parallel to the film surface (depending on ($h$00) plane angles to film surface). G. R. Pullian et al., Localized Doping of Epitaxial Ferrite Films, J. Applied Phys. 38, #5, pages 2192–2194. The magnetic vector can easily be rotated into the plane of the film with an expenditure of anisotropy energy which is compensated by a reduction in applied field energy with a result of higher remanence ratio than is normally expected in these materials. The X-ray diffraction data for these samples are:

|  | A | B | C | D | E |
|---|---|---|---|---|---|
| Lattice constant ($a_0$) | 8.386 | 8.366 | 8.386 | 8.482 | 12.392 |
| Percent increase of (400) reflection | 158 | 150–200 | 143–168 | 160 | 100–139 |

FIG. 2 shows the X-ray diffraction powder pattern of Sample A contrasted with the randomly oriented ferrite feed stock.

Magnetic measurements were made after annealing. Sample A was annealed at 1200° C. for 6 hours, furnace cooled to 400° C., held for 20 hours, quenched in air. Sample B was annealed at 1200° C. for 6 hours, furnace cooled.

The saturation magnetization $4\pi M_s$ and the remanence ratio $M_r/M_s$ were determined by the method described in Lincoln Laboratory Technical Note 1968–27, "A High-Field Hysteresigraph," July 24, 1968, M.I.T., by J. A. Weiss. Data are presented below wherein comparison is made with the ferrite feed stock for A:

|  | Sample | | Ferrite feed stock for A |
|---|---|---|---|
|  | 8-A | 8-B |  |
| Saturation magnetization | 2,350 | 1,933 | 2,150 |
| Coercivity | 1.8 | 1.5 | 1.8 |
| Remanence ratio | 0.86 | 0.81 | 0.75 |

Figure 3:
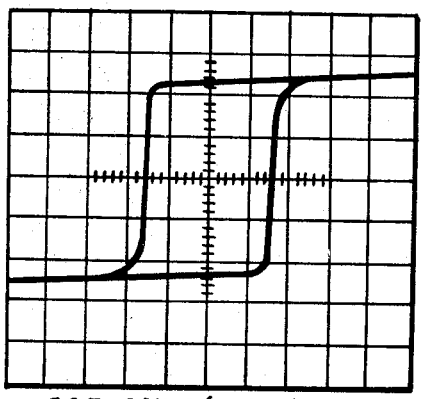
In FIG. 3 there is shown a square loop hysteresis ($4\pi M$ vs. H) curve for a plasma-deposited, annealed magnesium manganese ferrite. The respective vertical and horizontal scales are shown for interpretation.

FIG. 3 illustrates the square-loop remanence curve obtained for sample 8–A.

Literature cites the normal observed value of remanence ratio to be 0.67 for magnesium manganese ferrite systems and the calculated maximum remanence ratio to be 0.87 neglecting internal crystallite interaction for isotropic polycrystalline materials.

Example 9

To determine the dielectric properties of a plasma-deposited coating of a magnesium manganese ferrite.

A magnesium manganese ferrite was used, containing approximately 15.4% magnesium, 3.8% manganese and 47.6% iron. It was ground to pass a 400 mesh sieve, X-ray diffraction analysis of this ferrite revealed that 92–95% of the crystalline content by weight was attributable to a spinel phase having $a_0$=8.397 and 5–8% to a wustite phase having $a_0$=4.212.

The plasma arc gun was used as described in Example 2. The specific conditions used for deposition were as follows:

Substrate: magnesium titanate
Arc gas flow: 122 c.f.h. argon
Arc current: 410 amp.
Carrier gas flow: 16 c.f.h. oxygen
Shroud gas flow: 55 c.f.h. oxygen
Substrate preheat temperature: 1050° C.
Substrate distance: 0.75 in.
Annealing conditions: 1200° C. for 6 hours, furnace cooled to 600° C. and held for 20 hours. Sample then quenched in air.

The coating was built up to a thickness of 9.5 mils.

A determination of electrical properties gave dielectric constant ($\epsilon'$)=12.3; loss tangent (tan $\delta$)=<0.0002.

Example 10

To determine the compositional uniformity of a plasma-deposited coating of a magnesium manganese aluminum-substituted ferrite.

A magnesium manganese aluminum-substituted ferrite was used, containing approximately 12.9% magnesium, 2.7% manganese, 3.0% aluminum and 47.5% iron, with the remainder essentially oxygen. It was ground to pass a 400 mesh sieve. X-ray diffraction analysis of this ferrite revealed that 98% of the crystalline content by weight was attributable to a spinel phase having $a_0$=8.368 A. and 2% to a wustite species having $a_0$=4.215 A.

The plasma arc gun was used as described in Example 2. The specific conditions used for deposition were as follows:

Substrate: 5-mil platinum foil, 1 x 1 in.
Arc gas flow: 140 c.f.h. argon
Arc current: 600 amperes Carrier gas flow: 5.5 c.f.h. oxygen
Shroud gas flow: 66 c.f.h. oxygen
Substrate preheat temperature: 1200° C.
Substrate distance: 1.0 in.
Annealing conditions: 1200° C./6 hrs.

Nine uniformly distributed spots over the sample surface were radiated and analyzed for elemental components by the total counts method using an electron microprobe technique. A Cambridge Mark II Microprobe Analyzer was employed using a 1 to 2 micron beam size with a current level of $1 \times 10^{-7}$ amperes at 15 kv. The experimental error established earlier for iron and manganese with this analytical method was observed to be approximately ±2% and ±4.5%, respectively, at the count level found in the sprayed ferrite film.

| Iron | Manganese | Aluminum | Magnesium |
|---|---|---|---|
| 46734 | 4548 | 981 | 908 |
| 47088 | 5092 | 950 | 935 |
| 44556 | 4750 | 1025 | 876 |
| 44722 | 5073 | 1016 | 981 |
| 44783 | 4981 | 923 | 881 |
| 45184 | 4808 | 1037 | 897 |
| 45582 | 4729 | 1065 | 946 |
| 43984 | 4848 | 865 | 940 |
|  | 4743 | 949 | 873 |

Since one of the iron counts was missed in analyzing the sample, data from eight of the nine sample areas were analyzed statistically. The mean and standard deviation were calculated for the iron and manganese data. Within the limits of the electron microprobe technique for these elements, no statistical deviation from homogeneity could be found. Multiple regression analyses showed that the variation between these two elements (including individual variation) was less than 5%. These results are summarized below:

| Element | Mean (counts) | Standard deviation (counts) | Uncertainty | Experimental error (percent) |
|---|---|---|---|---|
| Iron | 45,329 | 1,086 | 2.4 | ±2 |
| Manganese | 4,879 | 149 | 3.1 | ±4.5 |

On the basis of these findings, it can be concluded that this typical plasma-deposited ferrite film was homogeneous in composition over the area deposited and analyzed.

Example 11

To determine magnetic and electrical properties of plasma-deposited magnesium manganese aluminum-substituted ferrite.

A magnesium manganese ferrite was used, containing approximately 12.9% magnesium, 2.7% manganese, 3% aluminum, and 47.5% iron with the remainder essentially oxygen. It was ground to pass a 400 mesh sieve. X-ray diffraction analysis of this ferrite revealed that 98% of the crystalline content by weight was attributable to a spinel phase having $a_0=8.397$ and 2% to a wustite phase having $a_0=4.212$.

A commercially-available high velocity plasma arc torch was used, Plasmadyne Model SG-1B, as described in Bulletin 1001 of Giannini Scientific Corporation, Santa Ana, Calif. The ground ferrite was introduced into the torch with a carrier gas.

The specific conditions used for deposition were as follows:

Substrate: magnesium titanate (Trans Tech D-13)
Arc gas flow: 106 c.f.h. argon
Arc current: 500 amperes
Carrier gas flow: 33 c.f.h. oxygen
Shroud gas flow: 38.5 c.f.h. oxygen
Substrate preheat temperature: 1000° C.
Substrate distance: 1.125 in.
Annealing conditions: 1200° C./6 hrs. in air and furnace shut off to cool.

Magnetic and electrical properties were observed as follows:

Saturation magnetization ($4\pi M_s$), gauss _____ 1933
Line width ($\Delta H$) in oersteds at 9.45 Hz. _____ 368
g-Effective at 9.46 Hz. _____ 1.99
Dielectric constant ($\epsilon'$) @ 9.46 Hz. _____ 10.1
Dielectric loss tangent (tan $\delta$) at 9.46 Hz. _____ 0.0006
Spin wave line width ($\Delta H_k$) in oersteds at 9.46 Hz. _____ 3.5
Coercivity (oersteds) _____ 1.16
Remanence ratio _____ 0.81

The saturation magnetization $4\pi M_s$ and the remanence ratio $M_r/M_s$ were determined by the method described in Lincoln Laboratory Technical Note 1968-27, "A High-Field Hysteresigraph," July 24, 1968, M.I.T., by J. A. Weiss.

The dielectric constant and loss tagent were determined by ASTM method C-525-63-T on "Complex Dielectric Constant of Non-Metallic Magnetic Materials at Microwave Frequencies."

Example 12

To compare argon with oxygen as a carrier and shroud gas for plasma-deposited magnesium manganese aluminum-substituted ferrite.

A magnesium manganese aluminum-substituted ferrite was used, containing approximately 12.9% magnesium, 2.7% manganese, 3.0% aluminum and 47.5% iron with the remainder essentially oxygen. It was ground to pass a 400 mesh sieve. X-ray diffraction analysis of this ferrite revealed that 98% of the crystalline content by weight was attributable to a spinel phase having $a_0=8.368$ A. and 2% to a wustite species having $a_0=4.215$ A.

A plasma arc torch was used as described in Example 2.

The specific conditions used for deposition are shown in the following table, together with the properties of the as-deposited coatings. For all of the coatings, the substrate consisted of 20-mil alumina (Diamonite P-3864).

| | A | B |
|---|---|---|
| Conditions: | | |
| Arc gas flow argon, c.f.h. | 140 | 140 |
| Arc current, amperes | 600 | 600 |
| Carrier gas flow, c.f.h. | [1]20 | [2]20 |
| Shroud gas flow, c.f.h. | [1]60 | [2]60 |
| Distance to substrate, inches | 0.75 | 0.75 |
| Substrate preheat temp., ° centigrade | 1,050 | 1,050 |
| Properties of coating: Normalized sheet resistivity, $\Omega/\square$ | $1 \times 10^6$ | $>1 \times 10^{10}$ |

[1] Argon.  [2] Oxygen.

Example 13

To compare argon with oxygen as a carrier and shroud gas for plasma-deposited nickel zinc ferrite.

A nickel zinc ferrite was used, containing approximately 15.2% nickel, 11.3% zinc, 0.5% manganese, and 45.9% iron. It was ground to pass a 400 mesh sieve. X-ray diffraction analysis of this ferrite gave a lattice constant ($a_0$) of 8.385.

A plasma arc torch was used as described in Example 2.

The specific conditions used for deposition are shown in the following table, together with the properties of the as-deposited coatings. For all of the coatings, the substrate consisted of 20-mil alumina (Diamonite P-3864).

| | A | B |
|---|---|---|
| Conditions: | | |
| Arc gas flow argon, c.f.h. | 55 | 55 |
| Arc current, amperes | 350 | 350 |
| Carrier gas flow, c.f.h. | [1]15 | [2]15 |
| Shroud gas flow, c.f.h. | [1]10 | [2]10 |
| Distance to substrate, inches | 0.75 | 0.75 |
| Substrate preheat temp., ° centigrade | 480 | 480 |
| Properties of coating: Normalized sheet resistivity, $\Omega/\square$ | $1.1-1.5 \times 10^3$ | $1.0 \times 10^5$ |

[1] Argon.  [2] Oxygen.

Example 14

To illustrate the preparation of a free-standing ferrite body, a sphere of about 0.100 in. thickness was fabricated.

A magnesium manganese aluminum-substituted ferrite was used, containing approximately 12.9% magnesium, 2.7% manganese, 3.0% aluminum and 47.5 iron, with the remainder essentially oxygen. It was ground to pass a 400 mesh sieve. X-ray diffraction analysis of this ferrite revealed that 98% of the crystalline content by weight was attributable to the spinel phase having $a_0 = 8.368$ A. and 2% to a wustite species having $a_0 = 4.215$ A.

The plasma arc torch was used as described in Example 2.

The specific conditions used were as follows:

Substrate: ¼" diameter Inconel rod
Arc gas flow, c.f.h. argon: 106
Arc current, amp.: 500
Carrier gas flow, c.f.h. oxygen: 22
Shroud gas flow, c.f.h. oxygen: 38
Substrate preheat temperature, °C.: 1050
Substrate distance, inches: 1.5

The coating was built up on the end of the rod to a thickness of about 0.15 in., as a dense, uniform deposit. It was removed from the rod and ground to 0.100 in. diameter.

A magnetic measurement showed saturation magnetization $4\pi M_s = 1933$ gauss.

What we claim is:

1. A method for depositing, on a substrate, a ferrite coating of high uniformity having a controlled lattice constant ($a_0$) and crystallite size comprising the steps
    (a) forming an arc-plasma stream from a flowing arc gas by means of a direct current arc in an arc-plasma torch,
    (b) introducing a finely-powdered ferrite into a flowing powder-carrier gas,
    (c) passing said powder-carrier gas and said ferrite into said arc-plasma stream so as to heat said ferrite, thereafter discharging the heated ferrite at a torch nozzle,
    (d) providing an atmosphere surrounding said heated ferrite, containing from about 15% to 65% oxygen, and
    (e) causing the heated ferrite to impinge against and adhere to a substrate.

2. A method of claim 1 in which the substrate is preheated to a temperature within the range 25–1200° C.

3. A method of claim 1 in which the heated ferrite is surrounded with a shroud gas between the torch nozzle and the substrate.

4. A method of claim 1 in which the heated ferrite is surrounded with a shroud gas between the torch nozzle and the substrate, and the substrate is preheated to a temperature within the range 25–1200° C.

5. A method of claim 4 wherein the ferrite is selected from the group consisting of a magnesium manganese ferrite and a magnesium manganese aluminum-substituted ferrite, the arc gas flow is within the range 18–140 c.f.h. of argon, the arc current is within the range 300–600 amp., the powder carrier gas flow is within the range 10–35 c.f.h. of oxygen, the shroud gas flow is within the range 22–70 c.f.h. of oxygen, the substrate preheat temperature is within the range 600–1200° C., and the substrate distance from the torch is within the range of 0.5–2.5 in.

6. A method of depositing a ferrite as recited in claim 5 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

7. A method of claim 4 wherein the ferrite is a nickel zinc ferrite, the arc gas flow is within the range 50–140 c.f.h. of argon, the arc current is within the range 300–600 amp., the powder carrier gas flow is within the range 8–45 c.f.h. of oxygen, the shroud gas flow is within the range 10–50 c.f.h. of oxygen, the substrate preheat temperature is within the range 25–850° C., and the substrate distance from the torch is within the range of 0.5–2.5 in.

8. A method of depositing a ferrite as recited in claim 7 in which the ferrite is a nickel zinc ferrite containing approximately 7 to 15% nickel, 12% zinc, and 1% manganese, with the remainder essentially iron and oxygen.

9. A method of claim 4 wherein the ferrite is an yttrium iron garnet, the arc gas flow is within the range 100–250 c.f.h. of argon, the arc current is within the range 300–600 amp., the powder carrier gas flow is within the range 10–35 c.f.h. of oxygen, the shroud gas flow is within the range 30–65 c.f.h. of oxygen, the substrate preheat temperature is within the range 600–1200° C., and the substrate distance from the torch is within the range of 0.5–2.5 in.

10. A method of depositing a ferrite as recited in claim 9 in which the ferrite is an yttrium iron garnet containing approximately 25–36% yttrium, and 0.10% cerium, with the remainder essentially iron and oxygen.

11. A method for depositing, on a substrate, a crystalline ferrite coating having preferred orientation of the ($h$00) planes of atoms of the crystal structure parallel to the surface of the substrate comprising the steps
    (a) forming an arc-plasma stream from a flowing arc gas by means of a direct current arc in an arc-plasma torch,
    (b) introducing a finely-powdered ferrite into a flowing powder-carrier gas,
    (c) passing said powder-carrier gas and said ferrite into said arc-plasma stream so as to heat said ferrite, thereafter discharging the heated ferrite at a torch nozzle,
    (d) providing an atmosphere surrounding said heated ferrite containing from about 15% to 65% oxygen, and
    (e) causing the heated ferrite to impinge against and adhere to a substrate.

12. A method of preparing a ferrite film having a remanence ratio ($M_r/M_s$) of over 0.80, where $M_r$ is the magnetic moment remanence and $M_s$ is the magnetic moment saturation, comprising the steps
    (a) forming an arc-plasma stream from a flowing arc gas by means of a direct current arc in an arc-plasma torch,
    (b) introducing a finely-powdered ferrite into a flowing powder-carrier gas,
    (c) passing said powder-carrier gas and said ferrite into said arc-plasma stream so as to heat said ferrite, thereafter discharging the heated ferrite at a torch nozzle,
    (d) providing an atmosphere surrounding said heated ferrite, containing from about 15% to 65% oxygen, and
    (e) causing the heated ferrite to impinge against and adhere to a substrate.

13. A method for depositing, on a substrate, a ferrite coating having coercivity varying not more than 10% comprising the steps
    (a) forming an arc-plasma stream from a flowing arc gas by means of a direct current arc in an arc-plasma torch,
    (b) introducing a finely-powdered ferrite into a flowing powder-carrier gas,
    (c) passing said powder-carrier gas and said ferrite into said arc-plasma stream so as to heat said ferrite, thereafter discharging the heated ferrite at a torch nozzle,
    (d) providing an atmosphere surrounding said heated ferrite, containing from about 15% to 65% oxygen, and
    (e) causing the heated ferrite to impinge against and adhere to a substrate, and thereafter annealing the deposit to develop crystallites to the desired size.

14. A method of claim 11 in which the substrate is preheated to a temperature within the range 25–1200° C.

15. A method of claim 11 in which the heated ferrite is surrounded with a shroud gas between the torch nozzle and the substrate.

16. A method of claim 11 in which the heated ferrite is surrounded with a shroud gas between the torch nozzle and the substrate, and the substrate is preheated to a temperature within the range 25–1200° C.

17. A method of claim 16 wherein the ferrite is selected from the group consisting of a magnesium manganese ferrite and a magnesium manganese aluminum-substituted ferrite, the arc gas flow is within the range 78–140 c.f.h. of argon, the arc current is within the range 300–600 amp., the powder carrier gas flow is within the range 10–35 c.f.h. of oxygen, the shroud gas flow is within the range 22–70 c.f.h. of oxygen, the substrate preheat temperature is within the range 600–1200° C., and the substrate distance from the torch is within the range of 0.5–2.5 in.

18. A method of depositing a ferrite as recited in claim 17 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

19. A method of claim 16 wherein the ferrite is a nickel zinc ferrite, the arc gas flow is within the range 50–140 c.f.h. of argon, the arc current is within the range 300–600 amp., the powder carrier gas flow is within the range 8–45 c.f.h. of oxygen, the shroud gas flow is within the range 10–50 c.f.h. of oxygen, the substrate preheat temperature is within the range 25–850° C., and the substrate distance from the torch is within the range of 0.5–2.5 in.

20. A method of depositing a ferrite as recited in claim 19 in which the ferrite is a nickel zinc ferrite containing approximately 7 to 15% nickel, 12% zinc, and 1% manganese, with the remainder essentially iron and oxygen.

21. A method of claim 16 wherein the ferrite is an yttrium iron garnet, the arc gas flow is within the range 100–250 c.f.h. of argon, the arc current is within the range 300–600 amp., the powder carrier gas flow is within the range 10–35 c.f.h. of oxygen, the shroud gas flow is within the range 30–65 c.f.h of oxygen, the substrate preheat temperature is within the range 600–1200° C., and the substrate distance from the torch is within the range of 0.5–2.5 in.

22. A method of depositing a ferrite as recited in claim 21 in which the ferrite is an yttrium iron garnet containing approximately 25–36% yttrium, and 0.10% cerium, with the remainder essentially iron and oxygen.

23. A method of claim 12 in which the substrate is preheated to a temperature within the range 25–1200° C.

24. A method of claim 12 in which the heated ferrite is surrounded with a shroud gas between the torch nozzle and the substrate.

25. A method of claim 12 in which the heated ferrite is surrounded with a shroud gas between the torch nozzle and the substrate, and the substrate, is preheated to a temperature within the range 25–1200° C.

26. A method of claim 25 wherein the ferrite is selected from the group consisting of a magnesium manganese ferrite and a magnesium manganese aluminum-substituted ferrite, the arc gas flow is within the range 78–140 c.f.h. of argon, the arc current is within the range 300–600 amp., the powder carrier gas flow is within the range 10–35 c.f.h. of oxygen, the shroud gas flow is within the range 22–70 c.f.h. of oxygen, the substrate preheat temperature is within the range 600–1200° C., and the substrate distance from the torch is within the range of 0.5–2.5 in.

27. A method of depositing a ferrite as recited in claim 26 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

28. A method of claim 25 wherein the ferrite is a nickel zinc ferrite, the arc gas flow is within the range 50–140 c.f.h. of argon, the arc current is within the range 300–600 amp., the powder carrier gas flow is within the range 8–45 c.f.h. of oxygen, the shroud gas flow is within the range 10–50 c.f.h. of oxygen, the substrate preheat temperature is within the range 25–850° C., and the substrate distance from the torch is within the range of 0.5–2.5 in.

29. A method of depositing a ferrite as recited in claim 28 in which the ferrite is a nickel zinc ferrite containing approximately 7 to 15% nickel, 12% zinc, and 1% manganese, with the remainder essentially iron and oxygen.

30. A method of claim 25 wherein the ferrite is an yttrium iron garnet, the arc gas flow is within the range 100–250 c.f.h. of argon, the arc current is within the range 300–600 amp., the powder carrier gas flow is within the range 10–35 c.f.h. of oxygen, the shroud gas flow is within the range 30–65 c.f.h. of oxygen, the substrate preheat temperature is within the range 600–1200° C., and the substrate distance from the torch is within the range of 0.5–2.5 in.

31. A method of depositing a ferrite as recited in claim 30 in which the ferrite is an yttrium iron garnet containing approximately 25–36% yttrium, and 0.10% cerium, with the remainder essentially iron and oxygen.

32. A method of claim 13 in which the substrate is preheated to a temperature within the range 25–1200° C.

33. A method of claim 13 in which the heated ferrite is surrounded with a shroud gas between the torch nozzle and the substrate.

34. A method of claim 13 in which the heated ferrite is surrounded with a shroud gas between the torch nozzle and the substrate, and the substrate is preheated to a temperature within the range 25–1200° C.

35. A method of claim 34 wherein the ferrite is selected from the group consisting of a magnesium manganese ferrite and a magnesium manganese aluminum-substituted ferrite, the arc gas flow is within the range 78–140 c.f.h. of argon, the arc current is within the range 300–600 amp., the powder carrier gas flow is within the range 10–35 c.f.h. of oxygen, the shroud gas flow is within the range 22–70 c.f.h. of oxygen, the substrate preheat temperature is within the range 600–1200° C., and the substrate distance from the torch is within the range of 0.5–2.5 in.

36. A method of depositing a ferrite as recited in claim 35 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

37. A method of claim 34 wherein the ferrite is a nickel zinc ferrite, the arc gas flow is within the range 50–140 c.f.h. of argon, the arc current is within the range 300–600 amp., the powder carrier gas flow is within the range 8–45 c.f.h. of oxygen, the shroud gas flow is within the range 10–50 c.f.h. of oxygen, the substrate preheat temperature is within the range 25–850° C., and the substrate distance from the torch is within the range of 0.5–2.5 in.

38. A method of depositing a ferrite as recited in claim 37 in which the ferrite is a nickel zinc ferrite containing approximately 7 to 15% nickel, 12% zinc, and 1% manganese, with the remainder essentially iron and oxygen.

39. A method of claim 34 wherein the ferrite is an yttrium iron garnet, the arc gas flow is within the range 100–250 c.f.h. of argon, the arc current is within the range 300–600 amp., the powder carrier gas flow is within the range 10–35 c.f.h. of oxygen, the shroud gas flow is within the range 30–65 c.f.h. of oxygen, the substrate preheat temperature is within the range 600–1200° C., and the substrate distance from the torch is within the range of 0.5–2.5 in.

40. A method of depositing a ferrite as recited in claim 39 in which the ferrite is an yttrium, iron garnet containing approximately 25–36% yttrium, and 0.10% cerium, with the remainder essentially iron and oxygen.

41. A deposited ferrite coating on a substrate having less than 2% deviation in uniformity of composition, as measured by an electron probe, a density greater than 95% of the theoretical density, and crystallite size of less than 1 micron.

42. A deposited ferrite coating of claim 41 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

43. A deposited ferrite coating of claim 41 in which the ferrite is a nickel zinc ferrite containing approximately 7 to 15% nickel, 12% zinc, and 1% manganese, with the remainder essentially iron and oxygen.

44. A deposited ferrite coating of claim 41 in which the ferrite is an yttrium iron garnet containing approximately 25–36% yttrium, and 0.10% cerium, with the remainder essentially iron and oxygen.

45. A deposited crystalline ferrite coating on a substrate having preferred orientation of the ($h$00) planes of atoms of the crystal structure parallel to the surface of the substrate.

46. A deposited ferrite coating of claim 45 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

47. A deposited ferrite coating of claim 46 in which the ferrite is a nickel zinc ferrite containing approximately 7 to 15% nickel, 12% zinc, and 1% manganese, with the remainder essentially iron and oxygen.

48. A deposited ferrite coating of claim 45 in which the ferrite is an yttrium iron garnet containing approximately 25–36% yttrium, and 0.10% cerium, with the remainder essentially iron and oxygen.

49. A deposited monolithic ferrite coating on a substrate having preferred orientation of the easy axis of magnetization.

50. A deposited ferrite coating of claim 49 in which the ferrite is a magnesium manganese ferrite containing approximately 1 to 15% magnesium, 3 to 19% manganese, 0 to 6% zinc, and 0 to 3% aluminum, with the remainder essentially iron and oxygen.

51. A deposited ferrite coating of claim 49 in which the ferrite is a nickel zinc ferrite containing approximately 7 to 15% nickel, 12% zinc, and 1% manganese, with the remainder essentially iron and oxygen.

52. A deposited ferrite coating of claim 49 in which the ferrite is an yttrium iron garnet containing approximately 25–36% yttrium, and 0.10 cerium, with the remainder essentially iron and oxygen.

References Cited

UNITED STATES PATENTS

| | | | |
|---|---|---|---|
| 3,100,295 | 8/1963 | Schweizerhof | 117—105.2X |
| 3,197,334 | 7/1965 | Wade | 117—235X |
| 3,340,084 | 9/1967 | Eisenlohr | 117—105X |
| 3,341,308 | 9/1967 | Vanarkel | 117—235X |
| 3,436,248 | 4/1969 | Ditrich et al. | 117—105 |
| 3,001,891 | 9/1961 | Stoller | 117—235X |

OTHER REFERENCES

Hall: "Product Engineering," Dec. 6, 1965, pp. 59–64.

Metco: "The Metco Flame Spraying Processes," 117–105.2, pp. 1, 7, 11 1960, Metallizing Engineering Co. Inc., Westbury, N.Y.

ALFRED L. LEAVITT, Primary Examiner

J. H. NEWSOME, Assistant Examiner

U.S. Cl. X.R.

117—93.1; 340—174